United States Patent [19]

Fond

[11] Patent Number: 5,197,374
[45] Date of Patent: Mar. 30, 1993

[54] APPARATUS FOR EXTRACTING CARTRIDGES CONTAINING COFFEE

[75] Inventor: Olivier Fond, Yverdon, Switzerland

[73] Assignee: Nestec S.A., Vevey, Switzerland

[21] Appl. No.: 724,605

[22] Filed: Jul. 2, 1991

[30] Foreign Application Priority Data

Jul. 27, 1990 [EP] European Pat. Off. ......... 90114405.5

[51] Int. Cl.⁵ .............................................. A47J 31/06
[52] U.S. Cl. .................................... 99/295; 99/300
[58] Field of Search .................. 99/279, 283, 292, 295, 99/298, 300, 302 R, 318; 426/433

[56] References Cited

U.S. PATENT DOCUMENTS

| | | |
|---|---|---|
| 2,451,195 | 10/1948 | Brown . |
| 2,869,451 | 1/1959 | Brandl . |
| 3,403,617 | 10/1968 | Lampe ................................. 99/295 |
| 4,136,202 | 1/1979 | Faure ................................... 99/295 |
| 4,254,694 | 3/1981 | Illy ...................................... 99/295 |
| 4,429,623 | 2/1984 | Illy ...................................... 99/295 |
| 4,520,716 | 6/1985 | Hayes . |
| 4,550,024 | 10/1985 | Le Granse ............................ 99/295 |
| 4,846,052 | 7/1989 | Favre et al. ........................... 99/295 |
| 4,853,234 | 8/1989 | Bentley et al. ....................... 99/279 |
| 4,995,310 | 2/1991 | van der Lijn et al. ................ 99/295 |

FOREIGN PATENT DOCUMENTS

| | | |
|---|---|---|
| 7430109 | 3/1976 | Fed. Rep. of Germany . |
| 1255237 | 1/1961 | France . |
| 2062337 | 6/1971 | France . |
| 2182167 | 12/1973 | France . |
| 2556323 | 6/1985 | France . |
| 2617389 | 1/1989 | France . |

Primary Examiner—Harvey C. Hornsby
Assistant Examiner—James F. Hook
Attorney, Agent, or Firm—Vogt & O'Donnell

[57] ABSTRACT

A device for extraction of coffee contained in a cartridge has a sealing member, an injector member, a cartridge holder member and a tightening ring member. The sealing member has a surface which has a size sufficient to overlay and cover a surface of a cartridge containing coffee to be extracted. The injector member extends through the sealing member and sealing member surface and has outlets disposed for directing water ejected from the injector at an ascending angle with respect to the sealing member surface. The holder member has a first portion for enveloping and containing sides of a cartridge for supporting a cartridge, for enabling positioning a cartridge surface adjacent the sealing member surface and for enabling fluid-tight sealing of an edge of the cartridge surface to the sealing member surface. The holder also has a base having openings for enabling extracted coffee to flow out of the holder. Lugs extend from the holder to engage with ramps of the tightening ring to support the holder and to effect a fluid-tight seal between the cartridge and the sealing member surface.

13 Claims, 3 Drawing Sheets

APPARATUS FOR EXTRACTING CARTRIDGES CONTAINING COFFEE

BACKGROUND OF THE INVENTION

This invention relates to a process for the extraction of open coffee cartridges, to a coffee cartridge and to an extraction device for carrying out the process.

More particularly, the invention relates to the extraction of a roasted and ground coffee contained in a cartridge substantially frustoconical in shape by the injection of hot water under pressure.

There are several reasons for the use of coffee cartridges, above all in the field of espresso type coffees which are extracted under pressure, namely: hygiene, optimal storage of the coffee, ease of use, better control of the quality of the coffee obtained and better reproducibility of the extraction conditions.

Sealed cartridges which open under the pressure of the water injected satisfy these requirements.

EP 292 556, example, relates to cartridges which have weakened zones that tear preferentially under the effect of pressure.

This solution has the disadvantage of increasing the complexity and price of the cartridge because the materials used have to be treated very precisely to ensure that the cartridges open correctly and reproducibly.

EP 242 556 also describes an extraction device using cartridges of the above type and comprising a hollow cylindrical body having an internal shape substantially corresponding to the external shape of the cartridge to be extracted, the body comprising an injector at its upper end following the axis of the cylinder and, on its outer part, a spring retaining a ring for releasing the cartridge on completion of extraction. A device such as this enables a coffee of high quality to be obtained, but can only be used with a single type and shape of cartridge perfectly adaptable to the internal shape of the hollow cylinder.

SUMMARY OF THE INVENTION

The problem addressed by the present invention was to enable coffee to be extracted from a cartridge containing roasted and ground coffee which would eliminate the need for a weakened zone.

Another object of the invention was to provide a coffee cartridge for carrying out the process according to the invention.

A final object of the invention was to provide an extraction device which would operate by the process according to the invention and which would enable cartridges of different shapes to be used.

Accordingly, the present invention relates to a process for the extraction of an open cartridge containing roasted and ground coffee, the cartridge comprising an upper face provided with a circular bead and a lower face provided with a filter, in which a mixture of water and air is injected under pressure by an injector which is surrounded by a sealing surface and which pierces the upper face of the cartridge, imperviousness during extraction being established by compression of the circular bead of the cartridge against the sealing surface surrounding the injector, the mixture of water and air being injected within the cartridge a few millimetres below the upper face thereof and in an ascending direction.

In the context of the invention, an open cartridge is understood to be a cartridge which is not impervious to the outside air and which therefore has to be hermetically sealed in an individual bag or covered with a peelable film at the openings if it has to be stored for a prolonged period.

By means of this extraction process, in which the extraction liquid is injected upwards, the layer of coffee can be thoroughly wetted before the first drops flow from the cartridge, so that extraction can actually be carried out under pressure and, on the other hand, the formation of preferential circulation paths of the extraction liquid, which would result in inadequate extraction, can be avoided.

The present invention also relates to an open coffee cartridge for carrying out the process according to the invention comprising a cup with a lateral wall substantially frustoconical in shape and an upper face and a lower face, the upper face comprising a flange with a circular bead to which a lid is welded and the lower face comprising a filter separating the coffee contained in the cartridge from the outside air.

By virtue of this cartridge, which no longer requires a weakened zone for opening, the extraction characteristics are no longer dependent on the cartridge, but solely on the layer of coffee which it contains and the conditions under which the mixture of air and water is injected.

Finally, the present invention also relates to an extraction device for carrying out the process according to the invention comprising a tightening ring with tightening ramps for a cartridge holder, an injector for injecting a mixture of water and air under pressure which is coaxial with the tightening ring and which is surrounded by a sealing surface, a cartridge holder with two diametrically opposite retaining lugs intended to cooperate with the tightening ramps of the tightening ring, the water injector comprising means for injecting the mixture of air and water under pressure in an ascending direction at its end intended to perforate the lid of cartridge.

Other features and advantages of the invention will become apparent from the following description in conjunction with the accompanying drawings provided solely by way of example.

DETAILED DESCRIPTION OF THE DRAWINGS

Figure 1:
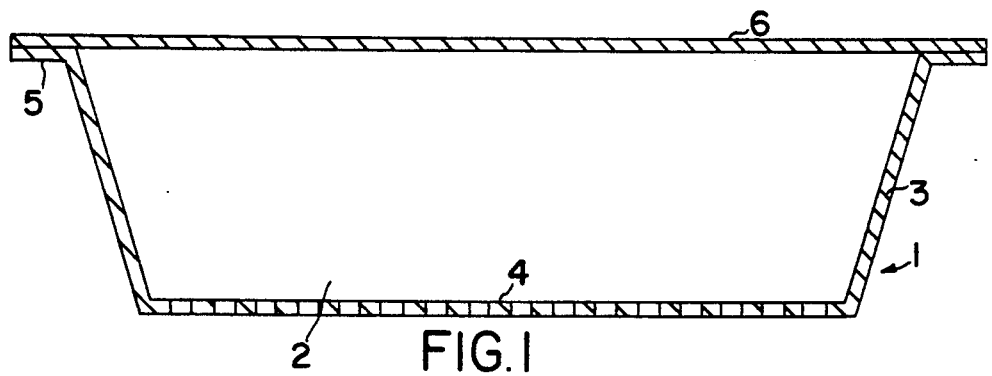
FIG. 1 is a diagrammatic section through a coffee cartridge according to the invention.

As shown in FIG. 1, a coffee cartridge 1 consists of a cup 2 having a lateral wall 3 and a base 4.

In the embodiment illustrated, the lateral wall 3 is frustoconical, the diameter of the base 4 being smaller than the diameter of the opening of the cup 2. By frustoconical is meant both frustoconical in the strict sense, as shown in FIG. 1, and also frustoellipsoidal, frustospherical or even cylindrical.

The cup 2 has a flange 5 which is external in relation to the lateral wall 3 and which is situated at that end of the wall 3 opposite the end adjacent the base 4.

A lid 6 forms the upper face of the cartridge 1. The flange 5 of the cup 2 is in the form of an annular bead which enables the cartridge to be firmly held in the extraction system.

The base 4 is pierced with holes intended for the passage for the extraction liquid which thus percolates through the layer of coffee situated inside the cartridge. The base 4 is thus a filter.

The cartridge 1 according to the invention is made of aluminium or of a plastic compatible with foods.

Since the filter formed by the base 4 has to be capable of withstanding considerable variations in pressure, it should have a thickness greater than that of the cup 2, namely, on the order of 100 to 300 $\mu$m and preferably on the order of 200 $\mu$m, when it is made of aluminium, and in the range from 300 to 1,000 $\mu$m, when it is made of plastic.

The cartridge 1 according to the invention may vary in size according to the volume of coffee which it is desired to prepare. The dose of coffee contained in the cartridge 1 may vary between 5 and 20 g, the diameter of the cartridge is between 2.5 and 6 cm, and the thickness of the coffee layer is between 20 and 25 mm.

In one embodiment of the invention, the base 4 of the cup 2 and the wall 3 are in one piece. In another embodiment of the invention, the cup 2 is formed by welding of a base 4 and a lateral wall 3.

Figure 2:
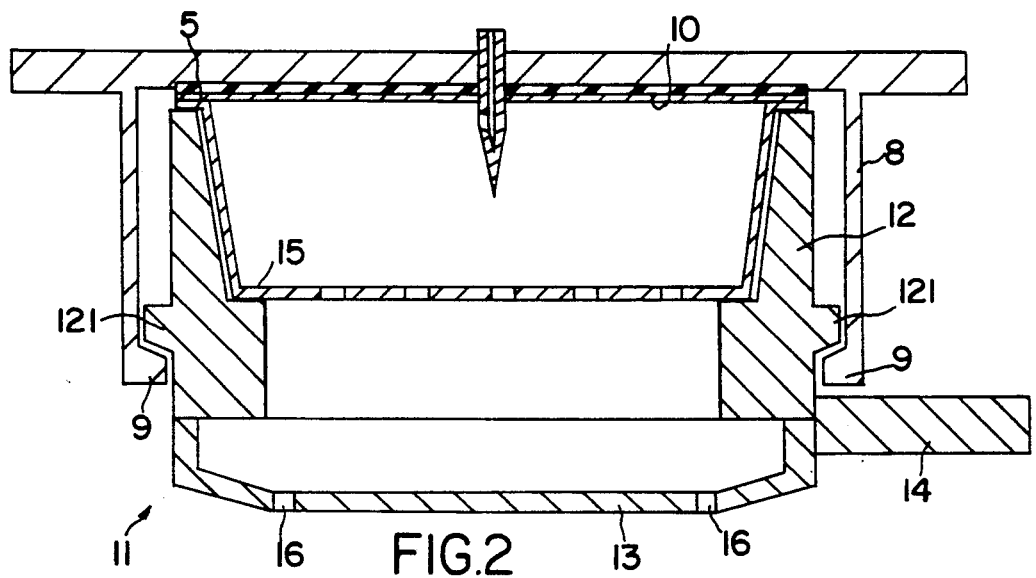
FIG. 2 is a diagrammatic section through the extraction device according to the invention.

The coffee cartridge 1 described above is intended to be placed in an extraction device of the type shown in FIG. 2.

Figure 3:
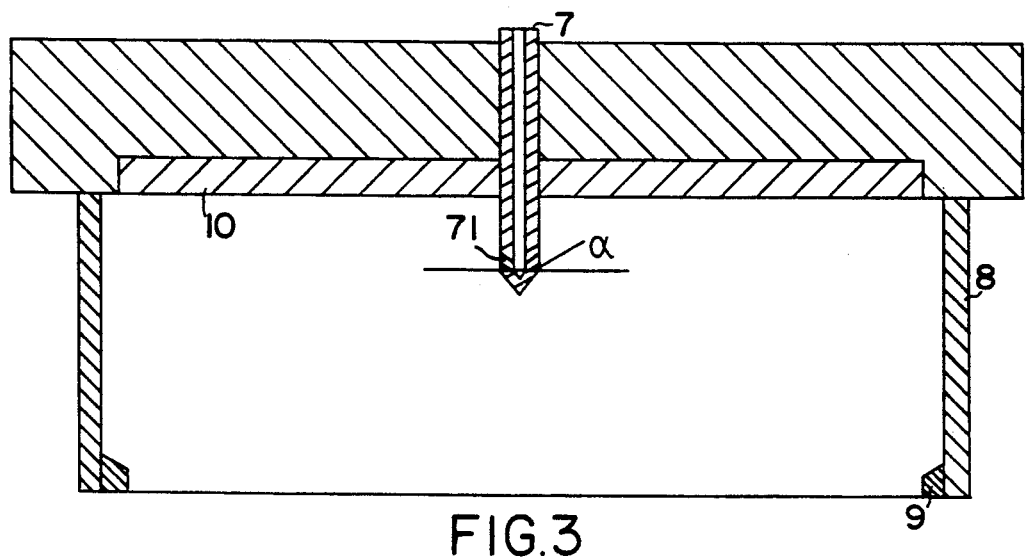
FIG. 3 is a detailed view of an element of the extraction device according to the invention shown in FIG. 2.

Referring to FIG. 3, which shows a detail of the extraction device illustrated in FIG. 2, it can be seen that the extraction device according to the invention comprises a water injector 7 with water outlet holders 71 forming an angle $\alpha$ with the horizontal. In FIG. 3, this angle is 20°, although it may be between 0° and 25°. The extraction device further comprises a tightening ring 8 with tightening ramps 9 situated at the lower end and on an inner face of the ring 8 and, around the periphery of the injector 7, a flat circular surface 10 of rubber to ensure imperviousness during extraction of the open cartridge 1.

The complete extraction system shown in FIG. 2 further comprises a cartridge holder 11 formed by an upper cylindrical envelope 12, a base 13 and a handle 14 which provides for easy handling of the cartridge holder.

Provided on the lower part of the cylindrical envelope 12 are two retaining lugs 121 designed to cooperate with the tightening ramps 9 of the tightening ring 8.

In addition, a circular flange 15 is provided on an inner face of the cylindrical envelope 12, being designed to act as an annular peripheral support for the base 4 of the coffee cartridge 1. In addition, as shown in FIG. 2, the upper part of each of the retaining lugs of the cartridge holder is designed to compress the flange 5 of the cartridge 1 against the circular rubber surface 10.

Finally, the cartridge holder 1 is formed in its base with openings 16 through which the coffee extract flows.

Figure 4:
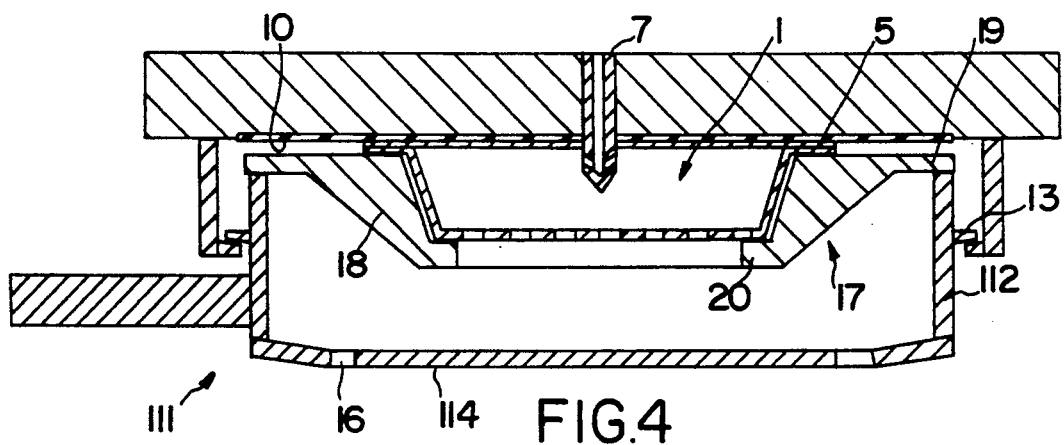
FIGS. 4, 5 and 6 are diagrammatic view of a first variant of the extraction device shown in FIG. 2.
Figure 5:
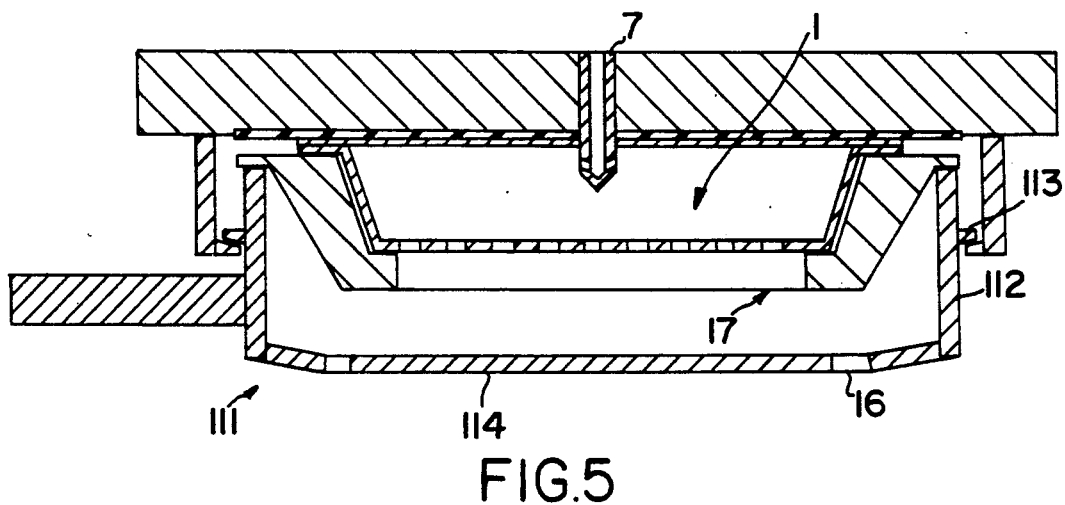
Figure 6:
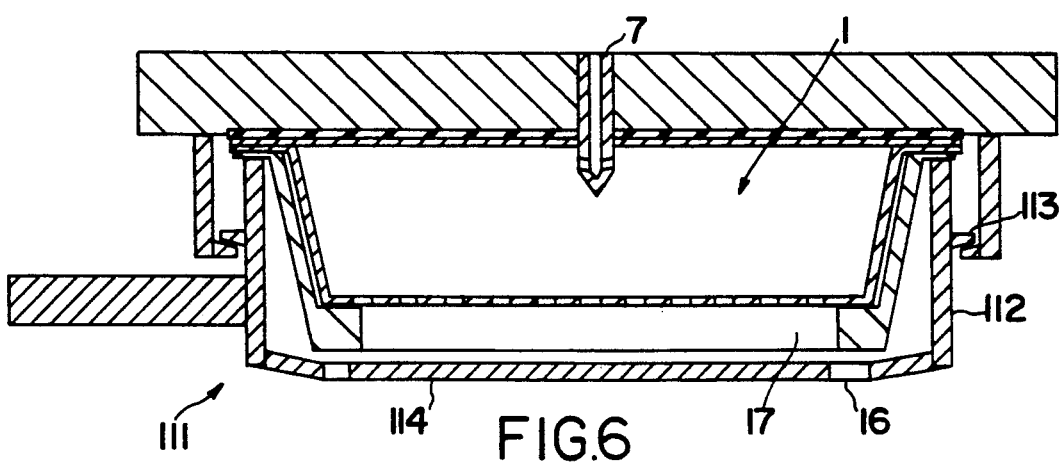

In a variant of the extraction device according to the invention which is shown in FIGS. 4, 5 and 6, the cartridge holder 11 no longer has an inner circular flange. Instead, the cartridge holder 11 is in two separate parts. The first part 111 consists of a cylindrical envelope 112 homologous with the envelope 12 of the preceding embodiment and provided with retaining lugs 113 and a base 114.

An insert 17, interposed between the part 111 and the sealing surface 10, forms the second part of the new cartridge holder 11.

The insert 17 consists of a vertical flank 18 and an upper, outer annular flange 19 and a lower, inner annular flange 20 homologous with the inner annular flange 15 of the extraction device shown in FIG. 2.

A recess for a coffee cartridge is thus formed inside the insert 17. This recess, which is substantially frustoconical in shape, is designed to receive a coffee cartridge of specific shape.

By virtue of this detachable insert, coffee can be extracted from cartridges of different shape using a first part 111 of one and the same shape, the imperviousness of the extraction step being guaranteed by compression of the flange 5 of the coffee cartridge between the upper outer annular flange 19 of the insert 17 and the circular sealing surface 10, the compression being created by means of the upper part of the cylindrical envelope 112 of the first part 111.

Irrespective of the embodiment selected with or without the insert 17, there is also an annular support surface formed either by the annular flange 15 of the cartridge holder 11 or by the annular flange 20 of an insert 17, which thus forms a central circular space opposite the base 4 of a cartridge 1.

Thus, a coffee cartridge 1 is always supported by its flange 5 on a corresponding support surface of the cylindrical envelope 12 of a cartridge holder 11 or on an annular flange 19 of an insert 17, the base 4 being in the immediate proximity of an annular flange formed either by the flange 15 of a cartridge holder 12 or by the flange 20 of an insert 17, a central circular space being opposite the base 4.

Figure 7:
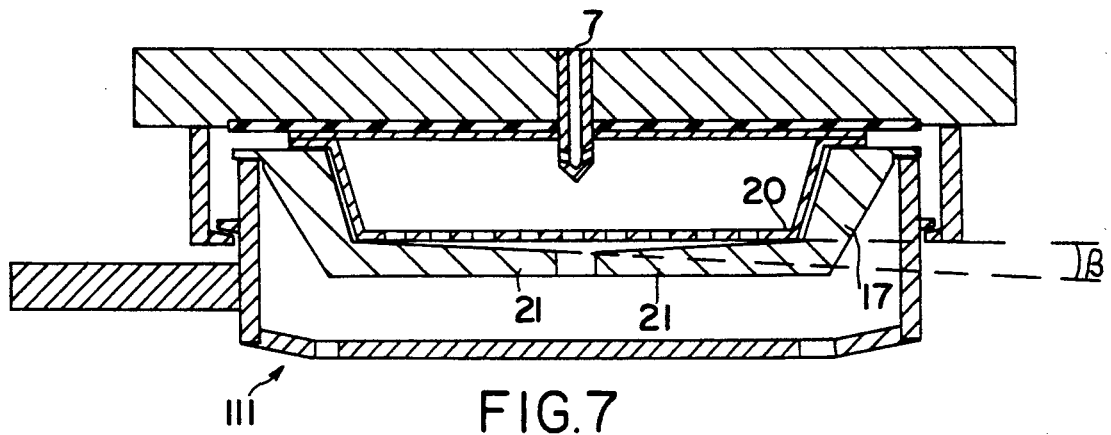
FIGS. 7 and 8 are diagrammatic view of two other variants of the extraction device shown in FIG. 2.

In a variant of the extraction device according to the invention shown in FIG. 7, the flange 20 of an insert 17 is extended in the internal radial direction by fins 21 which form an angle $\beta$ with the horizontal, the fins 21 being directed downwards. That is illustrated, fins 21 have a bevel with respect to and which angles away from the sealing member surface 10.

Figure 8:
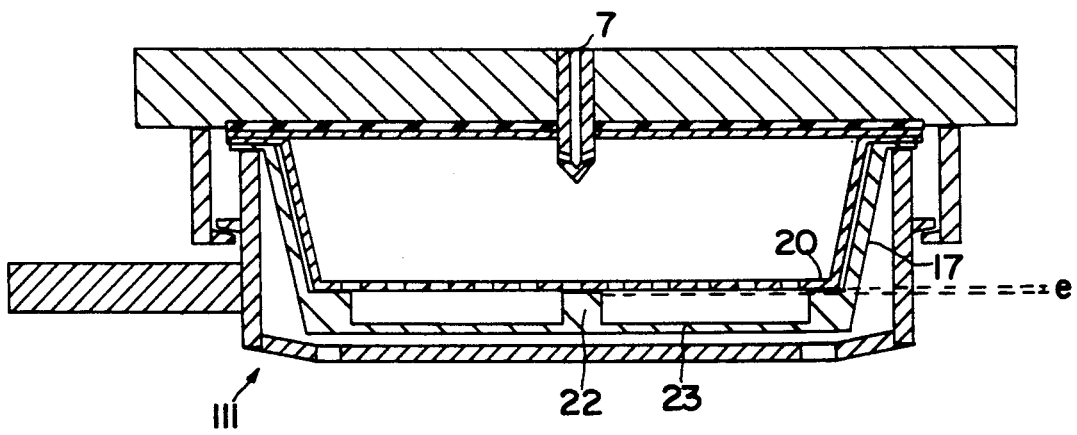

In another variant of the extraction device according to the invention shown in FIG. 8, a finger 22 positioned at the centre of the central circular space formed by the annular flange 20 is connected to the annular flange 20 by radial connecting elements 23. The upper face 24 of the finger 22 is at a distance e from the annular flange 20 which is the higher of the two.

The variants shown in FIGS. 7 and 8 have been described with reference to the annular flange 20 of an insert 17. It is obvious that these variants may also be directly applied to the annular flange 15 of a cartridge holder 11.

The finger and the fins serve to limit the stretching of the base of the cartridge during injection of the mixture of air and water under pressure. It is thus possible to use thinner bases 4 acting as filters, the bases 4 no longer having to withstand such intensive tractive forces.

Thus, as set forth in the prior disclosure and as can be seen from the drawing Figures, the extraction device of the present invention comprises, in its broadest embodiments, a sealing member having a sealing surface 10, an injector member 7, a cartridge holder member 11 and a tightening ring member 8.

The sealing surface 10 is of a size sufficient to overlay and cover a cartridge surface, such as cartridge surface 6 illustrated in FIG. 1, of a cartridge containing coffee to be extracted. As best illustrated in drawing FIG. 3, the injector member 7 extends through the sealing member and sealing member surface 10 and has outlets disposed for directing water ejected from the injector at an ascending angle, i.e., an angle of less than 90°, with respect to the sealing member surface, such as at an angle of between 90° and 65° with respect to the sealing member surface, to disperse the ejected water.

The holder member is defined by a first portion which envelopes and contains sides of a cartridge for supporting a cartridge containing coffee to be extracted, for enabling positioning a cartridge surface adjacent the sealing member surface 10 and for enabling sealing of an edge of the cartridge surface to the sealing member surface in a fluid-tight relation. The holder 11 also has a base portion having openings 16 for enabling extracted coffee to flow out of the holder.

The holder also has lugs 121 which extend to engage with ramps of a tightening ring which surrounds the first portion of the holder member to support the holder for compressing and fluid-tight sealing of a cartridge edge to the sealing member surface.

As illustrated, the tightening ring is connected to and extends from a member which accommodates the sealing member. As also illustrated in FIG. 2, the lugs extend from the first portion of the holder member, and as illustrated in FIGS. 4–8, which illustrate a first portion holder member which is a detachable insert, the lugs extend from the base portion of the holder member.

In operation, an extraction cartridge 1 according to the invention is placed in the extraction system, the cartridge 1 being placed either directly in a cartridge holder 11 or in an insert 17.

The cartridge holder 11 is locked in the tightening ring by means of the tightening ramps 9.

The introduction of the cartridge 1 causes the injector 7 to penetrate into the cartridge 1 by local tearing of the lid 6.

The water outlet holes 71 are arranged in such a way that the water is injected a few millimeters below the lid 6 and are thus remote from the tearing zone created by the penetration of the injector.

As already mentioned, the imperviousness of the extraction step is established by compression of the flange 5 of the cartridge 1 against the surface 10 of the extraction device by means of the upper part of the cartridge holder 11.

By being directed upwards, the water injected through the holes 71 of the injector 7 is deflected against the lower face of the lid 6 in the upper zone of the cartridge 1 and is returned towards the layer of coffee in much more dispersed form.

Thus, the water comes into contact with the layer of coffee after partial dispersion and no longer in the form of a few localized jets.

This phenomenon is important during the first few seconds of the extraction step when the layer of coffee has not stabilized. In addition, this dispersion is favourable if it is desired to obtain dispersion and reduction of the kinetic energy of the water injected so that the layer of coffee is not excessively compacted, thus avoiding the danger of the layer of coffee choking under an excessive pressure. By being lightly compacted, the layer of coffee leaves its place in the cartridge which is then taken by the water.

Throughout the rest of the extraction process, the jets of water are then released more or less into this volume of water and, in no case, are the jets directed directly onto the coffee.

During the extraction process under the effect of the hydrostatic pressure created by the drop in pressure of the layer of coffee contained in the cartridge, the lateral wall 3 of the cartridge tends to deform slightly, and the periphery of the base 4 is applied to the inner annular flange 15 of the cartridge holder 11 or to the inner annular flange 20 of the insert 17, depending on the embodiment selected.

The fact that the base 4 of the cartridge 1, which forms the filter, rests on the annular flange enables cartridges having a lateral wall of minimal thickness to be used, the stretching of the lateral wall 3 of the cartridge 1 caused by the expansion of the base 4 being absorbed by the annular flange.

If it is desired to use thin bases 4, for example to be able to use particular filtration surfaces, the use of an insert 17 or a cartridge holder 11 having a point and/or fins enables the stretching of the base 4 to be limited so that it does not tear.

During the extraction process, the lateral wall 3 of the cartridge is able to deform, but comes immediately into contact with a corresponding surface of the cartridge holder 11 or the insert 17 which also prevents it from tearing.

It is thus possible by virtue of the present invention to extract open coffee cartridges and, at the same time, to use cartridges of different shapes in one and the same extraction device.

I claim:

1. A device for extraction of coffee contained in a cartridge comprising:
   a sealing member having a surface having a size sufficient to overlay and cover a surface of a cartridge containing coffee to be extracted;
   an injector member which extends through the sealing member and sealing member surface and which has outlets disposed for directing water ejected from the injector at an angle less than 90° with respect to the sealing member surface;
   a holder member for holding a cartridge containing coffee to be extracted having
      a first portion for enveloping and containing sides of a cartridge for supporting a cartridge, for enabling positioning a cartridge surface adjacent the sealing member surface and for enabling fluid-tight sealing of an edge of a cartridge surface to the sealing member surface;
      a base portion extending from the first portion having openings for enabling extracted coffee to flow out of the holder, and
      lugs extending from an outer periphery of the holder member; and
   a tightening ring which surrounds the first portion of the holder member and has ramps positioned for engaging and supporting the holder member lugs for supporting the holder member and compressing and fluid-tight sealing a cartridge edge to the sealing member surface.

2. A device according to claim 1 wherein the injector outlets are configured to direct water at an angle of between 90° and 65° with respect to the sealing member surface.

3. A device according to claim 1 or 2 wherein the first portion of the holder has a peripheral flange for supporting a cartridge to be extracted which has a bevel with respect to and which angles away from the sealing member surface.

4. A device according to claim 1 or 2 wherein the sealing member surface is circular in shape and the holder member has a circular cross-section.

5. A device according to claim 1 or 2 further comprising means extending for a distance from the base of the holder towards the sealing surface member to assist in supporting a cartridge during extraction.

6. A device according to claim 5 wherein the means for assisting support is a finger member.

7. A device according to claim 1 or 2 wherein the first portion of the holder member is a detachable insert comprised of an outer flange which extends to a flank and to an inner flange positioned beneath the outer flange for the enveloping and containing sides of a cartridge for the supporting of a cartridge, for the enabling of positioning of a cartridge surface adjacent the sealing member surface and for the enabling of fluid-tight sealing.

8. A device according to claim 7 wherein the inner flange has a cartridge supporting surface which has a bevel with respect to and which angles away from the sealing member surface.

9. A device according to claim 8 wherein the detachable insert further comprises a connecting member connected to opposing sides of the inner flange and means extending for a distance from the connecting member towards the sealing surface member to assist supporting a cartridge during extraction.

10. A device according to claim 9 wherein the means for assisting support is a finger member.

11. A device according to claim 7 wherein the sealing member surface is circular in shape and wherein the holder member has a circular cross-section.

12. A device according to claim 1 or 2 wherein the lugs extend from the outer periphery of the first portion of the holder member.

13. A device according to claim 7 wherein the lugs extend from the base portion of the holder member.

* * * * *